Dec. 22, 1931.   J. V. LONGAN   1,837,664
BASKET CARRIER
Filed July 11, 1930    2 Sheets-Sheet 1

Inventor
John V. Longan
By Clarence A. O'Brien
Attorney

Dec. 22, 1931.  J. V. LONGAN  1,837,664
BASKET CARRIER
Filed July 11, 1930   2 Sheets-Sheet 2

Inventor
John V. Longan

By Clarence A. O'Brien
Attorney

Patented Dec. 22, 1931

1,837,664

UNITED STATES PATENT OFFICE

JOHN V. LONGAN, OF ARCHER CITY, TEXAS

BASKET CARRIER

Application filed July 11, 1930. Serial No. 467,379.

This invention relates to means for supporting a market basket or the like, upon rollers or casters, of the type having a frame adapted to support removably a plurality of baskets in superposed position.

It is the purpose of this wagon or carrier to make it convenient for a customer coming into a retail store or other place, where such carrier may be used, to place a basket in the lower part of the carrier and to place a basket in the upper part of the carrier in superposed position, and push the structure on its rollers, to any desired place and to fill such baskets with groceries or other merchandise, and then push said structure on its rollers to the checking counter or other desired place where the basket may be easily lifted from said carrier and placed upon a checking counter, or the like.

Another use for this invention is as a means of great convenience for a mother accompanied by a child, it being possible to carry the baby or child in one basket and the groceries or merchandise in the other basket, and provide a safe and convenient means for conveying said child and said groceries to any desired point in the store or the like.

Another object of this invention is to provide convenient means to expedite filling orders in wholesale drug houses, mercantile establishments, or in conveying merchandise or supplies from one location in the store or building, to another location.

It is the principal purpose of this device to provide a basket having the features described, and which is very hard to overbalance or upset, being lightweight, yet strong enough to be easily handled, thus avoiding the disadvantage of similar devices now in use in stores and mercantile establishments, which are easily overbalanced and cause thereby expensive damage to show cases and windows and the like.

It is to be understood that I do not wish to confine the application of this invention to the precise embodiment set forth therein, but that any change or changes may be made, consistent with the scope and spirit of the invention.

The objects mentioned, and other important objects and advantages, and the nature of the invention, its composition, and the combination and arrangement of parts, will be clearly understood from a reading of the accompanying drawings, and the descriptions thereof to follow.

In the drawings:—

Figure is a side elevational view of my invention.

Referring in detail to the drawings, 5 represents a market basket supported by the legs 10, at their upper ends, and the numeral 6 designates another market basket suspended between the legs 10 below the basket 5. The legs 10 have casters 11 at their lower ends to enable the basket to be wheeled over a floor or other surface.

Figure 1:
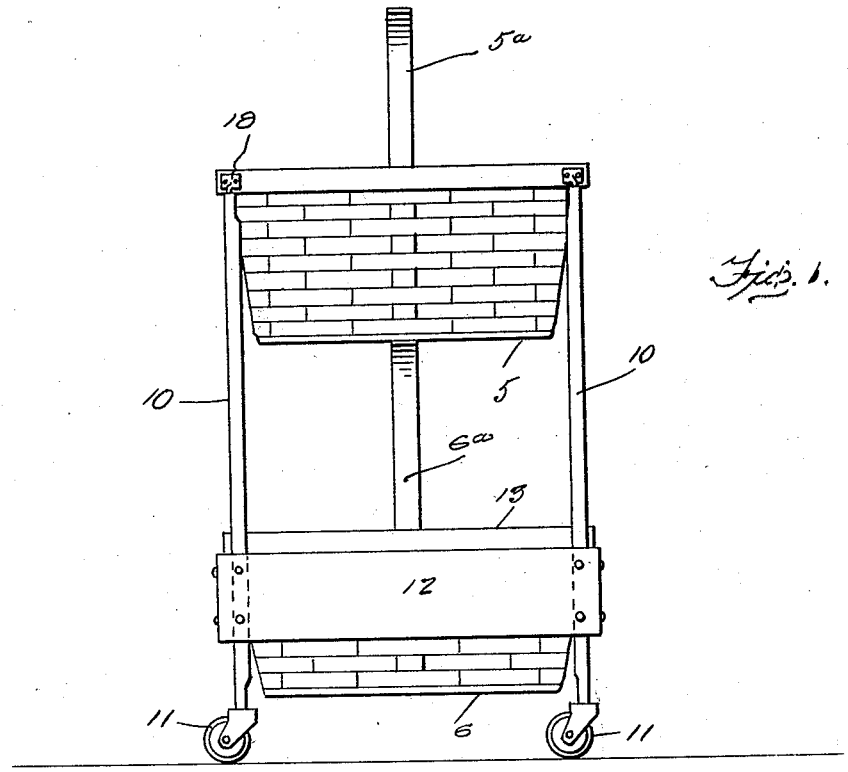
Figure 3:
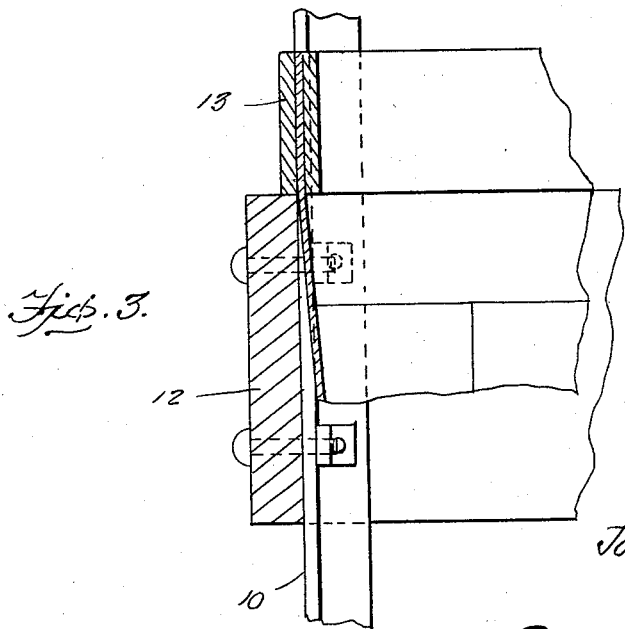
Fig. 3 is a detail view partly in section of one of the lower basket retaining elements.
Figure 2:
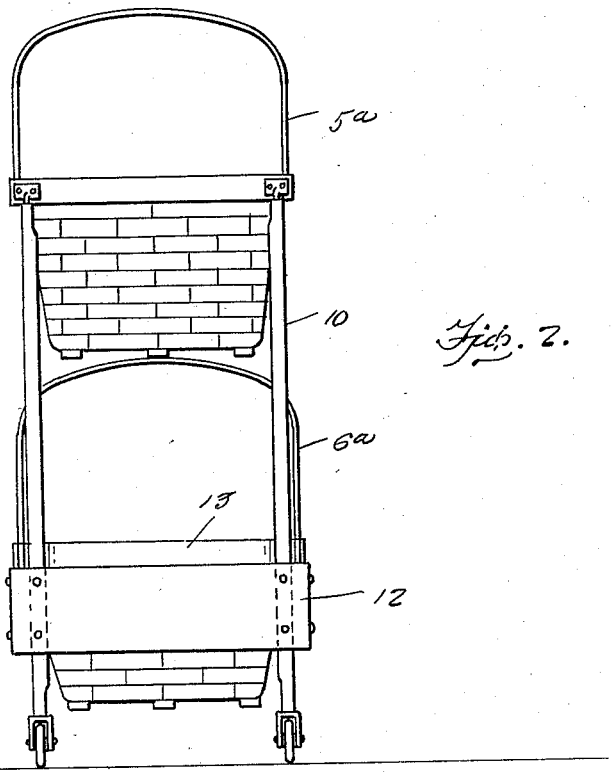
Fig. 2 is an end view in elevation.

The legs 10 are elements of a structure comprising the legs 10, the basket supporting truss members 12, which are bolted or otherwise secured to the legs 10, as shown in detail in Fig. 3, to form supports for the projection of the rim of the basket 6, as shown in detail in Fig. 3, as at 13.

The legs 10 may be formed of round or square pipe sections, or they may be of any suitable material or construction. The upper edges 14 of the members 10 are provided with reductions or funnel forms tapering to a reduced opening 15 to receive the hooks or projections 16 fastened to the corners of the market basket 5, as shown at 17, thus affording a means to suspend said upper basket 5 which then acts as a reinforcing element.

The projections or hooks 16 are formed on plates 18 secured to the outside of the corner portions of the basket 5, by any suitable means such as bolts, rivets.

Figure 4:
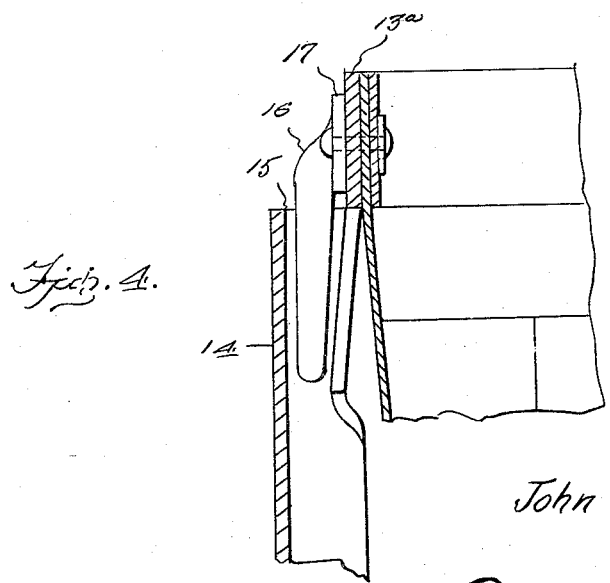
Fig. 4 is a detail view in cross section, showing a detail of the basket suspending means at the top of the device.

Referring to Fig. 4, it will be noted that the rim 13a similar to the rim 13 of the lower basket, rests upon the edge of the reduced end of the part 14, when the basket is in position.

Thus it will be seen that the upper basket is removed simply by lifting the same and thereby disengaging the hooks 16 from the reduced holes 15 in the ends of the leg 14, and then the lower basket 6 may be drawn up, and removed therefrom. The device may be made of different sizes and shapes to conform to the requirements of the material handled, and the use to which they are to be subjected.

The portions 14 of the legs 10 are formed to permit easy insertion of the hooks 15. The cross members 12 may be of metal, or of wood, or any suitable material, and the baskets 5 and 6 may be of any construction of the general type indicated.

The handle portion 5a and 6a of the basket is to provide means lifting them from the wagon carrier, and in the embodiment shown, the arrangement is made whereby to accommodate the upward projection of the same.

The legs 10 may be made of pipes or of angle iron or any suitable form of material. Thus, it will be seen that I have provided a device of the character described, admirably suited for the purpose for which it is designed, which will not easily overbalance, which is capable of being moved over the floor or other surface with little effort, to the convenience of the shopper, and which is simple, easy, and convenient of operation, and it is capable of being manufactured and shipped in quantities at a very cheap price, and which is an improvement over the existing art.

Having thus described my invention, what I claim as new is:—

A wagon for supporting market baskets comprising a number of vertically arranged leg forming members each having a caster wheel at its lower end, each leg being formed of angle iron with its flanges bent inwardly at the ends of the leg for forming the substantially tubular parts, the tubular part at the lower end of the leg receiving the caster wheel cross pieces connecting intermediate portions of the leg members together and a basket having depending projections at its corners which extend into the tubular part at the upper ends of the leg members for supporting the basket at the upper end of the leg members each projection comprising a plate-like member attached to the basket and a depending member having its upper end formed with the plate like member.

In testimony whereof I affix my signature.

JOHN V. LONGAN.